Figure 1:
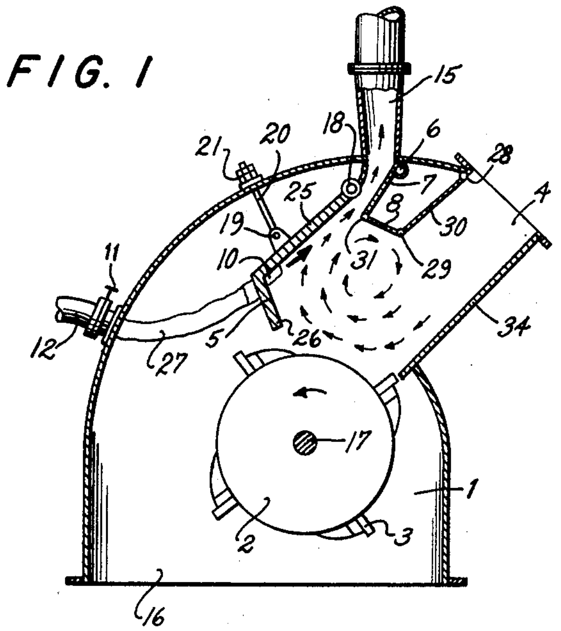

Oct. 25, 1960 E. ANDREAS 2,957,633

IMPACT MILL

Filed Aug. 6, 1959

INVENTOR.

Ehrhardt Andreas

BY Michael S. Striker

Attorney

United States Patent Office 2,957,633

Patented Oct. 25, 1960

2,957,633

IMPACT MILL

Ehrhardt Andreas, Admiral Scheer Strasse 8, Munster, Westphalia, Germany

Filed Aug. 6, 1959, Ser. No. 832,005

Claims priority, application Germany Aug. 7, 1958

17 Claims. (Cl. 241—57)

This invention relates to impact mills, and particularly to impact mills for breaking up a substance into parts of different specific weights.

It is an object of this invention to provide an impact mill which will on impact separate a substance into parts of different specific weights.

It is another object of this invention to provide an impact mill for breaking up a substance into parts of different specific weights and for separating such parts from each other.

It is another object of this invention to provide in an impact mill a stream of air to assist in the separation and collection of the parts of lower specific weight of a substance broken up in the impact mill.

It is a further object of this invention to provide means whereby a tangential part of a stream of air can be separated for collection of parts entrained in a stream of air.

It is a still further object of this invention to provide adjustable means for collection of the parts of lower specific weight of the substance broken up in the impact mill.

With these objects in view, a mill for the separation of a substance into parts of different specific weights, comprises a housing, inlet means for introducing the substance into the housing, impact means stationarily mounted in the housing spaced from the inlet means and rotor means mounted in the housing, the rotor means including projections extending from the rotor means for propelling the substance introduced into the housing against the impact means for separating the substance into parts of different specific weights and for producing a stream of air in which parts of the lower specific weight are to be entrained and carried along the impact means. First outlet means are located in the housing adjacent to the impact means for the discharge of parts having a lower specific weight entrained and carried by the stream of air and second outlet means are located in said housing below the impact means for the discharge of parts having a higher specific weight.

According to another aspect of the present invention, a mill for the separation of a substance into parts of different specific weights comprises a housing, inlet means for introducing the substance into the housing and including a wall portion, impact wall means stationarily mounted in the housing and spaced from the wall portion to form a circulation chamber with the same and rotor means mounted in the housing and including projections extending from the rotor means for propelling the substance introduced into the housing against the impact wall means for separating the substance into parts of different specific weights and for producing a stream of air directed against the impact wall means for entraining the parts of lower specific weight and carrying the same along the impact wall means. Also provided are first outlet means located in the circulation chamber adjacent to the impact wall means for the discharge of the parts having a lower specific weight, a deflector element adjacent the first outlet means and extending into the circulation chamber substantially parallel to the axis of rotation of the rotor means and spaced from the impact means for deflecting an outer layer of the stream of air moving toward said first outlet means and second outlet means located in said housing below said impact wall for the discharge of the parts having a higher specific weight whereby some of the parts of the substance entrained in the stream of air and moving along said impact wall means will be retained by said deflector element in said stream of air.

According to a still further aspect of this invention, the deflector element is elongated and hingedly connected to the housing so as to abut against the impact wall means and in one position close the outlet means for the parts having a lower specific weight.

Figure 2:
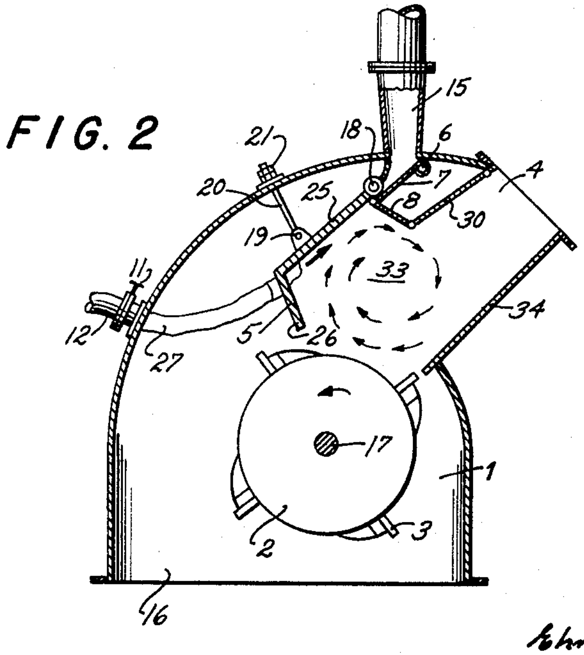

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a sectional elevational view of the device in one operating position; and Fig. 2 is a similar view of the device in another operational position.

Referring now to the drawings, housing 1 contains a rotor means 2 rotatably mounted on a shaft 17. A number of projections 3 are mounted on the rotor means 2 radially extending therefrom. Inlet means 4 leads into the housing and includes a wall portion 34 extending into the housing means and towards the rotor means so that a substance introduced through inlet means 4 will be moved towards the rotor means 2.

Impact means 5 is stationarily mounted in the housing 1 and includes two mutually inclined wall portions 25 and 26. The upper end of the impact wall portion 26 merges into a first outlet means 15 located above the rotor means 2. The impact means 5 is suspended in the housing on a spindle 18. Adjusting means for the impact means 5 includes a rod 20 hingedly connected by a pin 19 to a lower part of the impact means 2. The rod 20 protrudes through the housing and is fixed to the housing by the nut 21. A tightening or a loosening of nut 21 will lengthen or shorten the part of rod 20 located in housing 1 and thus will alter the distance of the impact means from the wall portion 34 and rotor means 2. This adjustment of the normally stationary impact means 5 varies for different substances.

The space above the rotor means bounded by the impact means 5 and the wall portion 34 defines a circulation chamber 33. Located between the inlet means 4 and the first outlet means 15 is a deflector element 7, extending into the circulation chamber 33 and having a lower edge substantially parallel to the axis of rotation of the rotor means 2. The deflector element 7 is hinged on a pin 6 fixed to housing 1. The deflector element, which is preferably elongated, has a lower edge onto which is hingedly connected by pin 31 an inner wall part 8. The other end of inner wall part 8 is hingedly connected to an outer wall part 28 by pin 29, while the upper edge of the outer wall part 30 is hingedly connected to the housing 1 by pin 28.

The deflector element 7 can be moved to occupy two positions. One position, as illustrated in Fig. 1, in which the element 7 is spaced from impact wall part 25 to leave a passage open to the first outlet means 15 and a second position, illustrated in Fig. 2, in which the deflector element 7 abuts against the wall part 25, so as to close the passage to the first outlet means 15.

A number of apertures 10 are provided in the impact means 10. A supply of air under pressure is connected through a pipe 12 to a hose 27 located in the housing and connects the apertures 10 to the supply of air under pressure. A valve 11 is located on pipe 12 so as to adjust and, if so desired, to cut off the supply of air pressure.

A second outlet means 16 is provided in housing 1 below the impact means 15 and below the rotor 2. The device works as follows:

A substance, such as raw asbestos, is introduced into the impact mill through the inlet means 4. The substance will be moved by gravity along the wall portions 34 towards the rotating rotor means 2, and the projections 3 will propel the substance against the impact means 5. The rocky part, the heavier part of the raw asbestos will fall back into the spaces between the projections 3 and will be carried by the rotor means towards the second outlet means 16, to be disposed of. The part of the raw asbestos containing the fibers, being of lower specific weight, will be carried upwards by the impelling force imparted to them by the projection 3. The speed of rotation of the rotor means 2 is such that a stream of air will be created in the circulation chamber 33 so as to carry the fibrous parts of the asbestos around in a circular path in the circulation chamber 33, generally indicated by the small arrows, shown in Figs. 1 and 2.

The circulation of the fibrous part of the asbestos in the circulation chamber 33 will tend to separate them into parts of long and short fibers. The strength of the air stream is such that preferably the longer fibers will be directed towards the first outlet means 15. This separation into short and long fibers and collection of the long fibers in the first outlet means 15 is assisted by the position of the deflector element 7 in relation to the impact wall part 25. This separation of the fibers and the circulation of the air stream is to a large extent regulated by the deflector element, as can be seen from the drawing. Deflector element will peel off an outer layer of the circular stream of air with the long fibers entrained in it and direct it towards outlet means 15, the other part of the air stream will be deflected into circulation chamber 33.

The air stream created by the rotation of the rotor means 2 can be increased by admission of air under pressure through pipe 12 and hose 27 passing through the apertures 10 of the impact means. This stream of air is, of course, directed in the direction of the air stream so as to assist the entrainment of the fibers and their separation into long and short fibers and collection of the long fibers through the first outlet means 15. Valve means 11 allow the shutting off and the adjusting of the air supply.

Impact means and separator elements have both lower edges which lie parallel to the axis of rotation of the rotor means 2. The supply of raw material to the inlet means 4 and the closure of the outlet means 15 can be synchronized so that the deflector element 7 is spaced from impact wall means 25 only when raw material is admitted to the inlet means 4. This synchronizing can be effected manually or automatically.

The parts of higher specific weight which pass out through the second outlet means 16 can be recirculated by introducing them again through the inlet means 4 as they may contain a certain amount of fibers which have not yet been separated by the impelling force of the rotor. Only one deflector element 7 is shown. It should however be understood that a number of deflector elements can be arranged successively so that a more refined separation of the fibers according to their length can be obtained. If more than one deflector element is incorporated in the impact mill, a separate outlet means can be provided for each deflector element.

While the invention has been described in connection with fibrous substances, such as asbestos, it can be equally well adapted to flaky substances or to any other substances which have to be separated into parts of higher and lower specific weight.

It will be understood that each of the elements described above, or two or more together, may also find a useful application in other types of impact mills differing from the types described above.

While the invention has been illustrated and described as embodied in an air circulation chamber, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a mill for the separation of a substance into parts of different specific weights, comprising, a housing; inlet means for introducing the substance into said housing and including a wall portion; impact wall means stationarily mounted in said housing spaced from said wall portion to form a circulation chamber with the same; rotor means mounted in said housing and including projections extending from said rotor means for propelling the substance introduced into said housing against said impact wall means for separating the substance into parts of different specific weights and for producing a stream of air directed against said impact wall means for entraining the parts of lower specific weight and carrying same along said impact wall means; first outlet means located in said circulation chamber adjacent to said impact wall means for the discharge of the parts having a lower specific weight; a deflector element adjacent said first outlet means and extending into said circulation chamber substantially parallel to the axis of rotation of said rotor means and spaced from said impact means for deflecting an outer layer of the stream of air moving towards said first outlet means; and second outlet means located in said housing below said impact means for the discharge of the parts having a higher specific weight whereby some of the parts of the substance entrained in the stream of air and moving along said impact wall means will be retained by said deflector element in said stream of air.

2. In a mill for the separation of a substance into parts of different specific weights, comprising a housing; inlet means for introducing the substance into said housing and including a wall portion; impact wall means stationarily mounted in said housing spaced from said wall portion to form a circulation chamber with the same; rotor means mounted in said housing and including projections extending from said rotor means for propelling the substance introduced into said housing against said impact wall means for separating the substance into parts of different specific weights and for producing a stream of air directed against said impact wall means for entraining the parts of lower specific weight and carrying same along said impact wall means; first outlet means located in said circulation chamber adjacent to said impact wall means for the discharge of the parts having a lower specific weight; a deflector element turnably mounted on said housing adjacent said first outlet means and extending into said circulation chamber substantially parallel to the axis of rotation of said rotor means and spaced from said impact means for deflecting an outer layer of the stream of air moving towards said first outlet means; and second outlet means located in said housing below said impact means for the discharge of the parts having a higher specific weight whereby some of the parts of the substance entrained in the stream of air and moving along said impact wall means will be retained by said deflector element in said stream of air.

3. In a mill for the separation of a substance into parts of different specific weights, comprising a housing; inlet means for introducing the substance into said housing and including a wall portion; impact wall means stationarily mounted in said housing spaced from said wall portion to form a circulation chamber with the same; rotor means mounted in said housing and including projections extending from said rotor means for propelling the substance introduced into said housing against said impact wall means for separating the substance into parts of different specific weights and for producing a stream of air directed against said impact wall means for entraining the parts of lower specific weight and carrying same along said impact wall means; first outlet means located in said circulation chamber adjacent to said impact wall means for the discharge of the parts having a lower specific weight; a deflector element turnably mounted on said housing adjacent said first outlet means and extending into said circulation chamber substantially parallel to the axis of rotation of said rotor means and spaced from said impact means for selectively deflecting an outer layer of the stream of air moving towards said first outlet means; and second outlet means located in said housing below said impact means for the discharge of the parts having a higher specific weight whereby some of the parts of the substance entrained in the stream of air and moving along said impact wall means will be retained by said deflector element in said stream of air.

4. In a mill for the separation of a substance into parts of different specific weights, comprising a housing; inlet means for introducing the substance into said housing and including a wall portion; impact wall means stationarily mounted in said housing spaced from said wall portion to form a circulation chamber with the same; rotor means mounted in said housing and including projections extending from said rotor means for propelling the substance introduced into said housing against said impact wall means for separating the substance into parts of different specific weights and for producing a stream of air directed against said impact wall means for entraining the parts of lower specific weight and carrying same along said impact wall means; first outlet means located in said circulation chamber adjacent to said impact wall means for the discharge of the parts having a lower specific weight, said impact wall means including a lower wall portion extending parallel to the axis of rotation of said rotor means and an upper wall portion extending towards said first outlet means; a deflector element turnably mounted on said housing adjacent said first outlet means and extending into said circulation chamber substantially parallel to the axis of rotation of said rotor means and spaced from said impact means for deflecting an outer layer of the stream of air moving towards said first outlet means; and second outlet means located in said housing below said impact means for the discharge of the parts having a higher specific weight whereby some of the parts of the substance entrained in the stream of air and moving along said impact wall means will be retained by said deflector element in said stream of air.

5. In a mill for the separation of a substance into parts of different specific weights, comprising, a housing; inlet means for introducing the substance into said housing and including a wall portion; impact wall means stationarily mounted in said housing spaced from said wall portion to form a circulation chamber with the same; rotor means mounted in said housing and including projections extending from said rotor means for propelling the substance introduced into said housing against said impact wall means for separating the substance into parts of different specific weights and for producing a stream of air directed against said impact wall means for entraining the parts of lower specific weight and carrying same along said impact wall means; adjusting means for selectively adjusting the spacing of said impact wall means from said wall portion and said rotor means; first outlet means located in said circulation chamber adjacent to said impact wall means for the discharge of the parts having a lower specific weight; a deflector element adjacent said first outlet means and extending into said circulation chamber substantially parallel to the axis of rotation of said rotor means and spaced from said impact means for deflecting an outer layer of the stream of air moving towards said first outlet means; and second outlet means located in said housing below said impact means for the discharge of the parts having a higher specific weight whereby some of the parts of the substance entrained in the stream of air and moving along said impact wall means will be retained by said deflector element in said stream of air.

6. In a mill for the separation of a substance into parts of different specific weights, comprising, a housing; inlet means for introducing the substance into said housing and including a wall portion; impact wall means stationarily mounted in said housing spaced from said wall portion to form a circulation chamber with the same; rotor means mounted in said housing and including projections extending from said rotor means for propelling the substance introduced into said housing against said impact wall means for separating the substance into parts of different specific weights and for producing a stream of air directed against said impact wall means for entraining the parts of lower specific weight and carrying same along said impact wall means; first outlet means located in said circulation chamber adjacent to said impact wall means for the discharge of the parts having a lower specific weight; an elongated deflector element adjacent to said first outlet means having an upper edge connected to said housing and a lower edge extending into said circulation chamber towards said rotor means and substantially parallel to the axis of rotation of said rotor means and including an inner wall part extending from said lower edge transverse to said impact wall means and an outer wall part extending from said inner wall part towards said housing, said elongated deflector element deflecting an outer layer of said stream of air moving towards said first outlet means; and second outlet means located in said housing below said impact means for the discharge of the parts having a higher specific weight whereby some of the parts of the substance entrained in the stream of air and moving along said impact wall means will be retained by said deflector element in said stream of air.

7. In a mill for the separation of a substance into parts of different specific weights, comprising, a housing; inlet means for introducing the substance into said housing and including a wall portion; impact wall means stationarily mounted in said housing spaced from said wall portion to form a circulation chamber with the same; rotor means mounted in said housing and including projections extending from said rotor means for propelling the substance introduced into said housing against said impact wall means for separating the substance into parts of different specific weights and for producing a stream of air directed against said impact wall means for entraining the parts of lower specific weight and carrying same along said impact wall means; first outlet means located in said circulation chamber adjacent to said impact wall means for the discharge of the parts having a lower specific weight; an elongated deflector element adjacent to said first outlet means having an upper edge hingedly connected to said housing and a lower edge extending into said circulation chamber towards said rotor means and substantially parallel to the axis of rotation of said rotor means and including an inner wall part hingedly connected to said lower edge and an outer wall part having one end hingedly connected to said inner wall part and another end hingedly connected to said housing, said elongated deflector element deflecting an outer layer of said stream of air moving towards said first outlet means; and second outlet means located i nsaid housing below said impact means for the discharge of the parts having a higher specific weight whereby some of the parts of the substance entrained in the stream of air and moving along said impact wall means will be retained by said deflector element in said stream of air.

8. In a mill for the separation of a substance into parts of different specific weights, comprising, a housing; inlet means for introducing the substance into said housing and including a wall portion; impact wall means stationarily mounted in said housing spaced from said wall portion to form a circulation chamber with the same; rotor means mounted in said housing and including projections extending from said rotor means for propelling the substance introduced into said housing against said impact wall means for separating the substance into parts of different specific weights and for producing a stream of air directed against said impact wall means for entraining the parts of lower specific weight and carrying same along said impact wall means; adjusting means for selectively adjusting the spacing of said impact wall means from said wall portion and said rotor means; first outlet means located in said circulation chamber adjacent to said impact wall means for the discharge of the parts having a lower specific weight; an elongated deflector element adjacent to said first outlet means having an upper edge connected to said housing and a lower edge extending into said circulation chamber towards said rotor means and substantially parallel to the axis of rotation of said rotor means and including an inner wall part extending from said lower edge transverse to said impact wall means and an outer wall part extending from said inner wall part towards said housing, said elongated deflector element deflecting an outer layer of said stream of air moving towards said first outlet means; and second outlet means located in said housing below said impact means for the discharge of the parts having a higher specific weight whereby some of the parts of the substance entrained in the stream of air and moving along said impact wall means will be retained by said deflector element in said stream of air.

9. In a mill for the separation of a substance into parts of different specific weights, comprising a housing; inlet means for introducing the substance into said housing and including a wall portion; impact wall means stationarily mounted in said housing spaced from said wall portion to form a circulation chamber with the same; rotor means mounted in said housing and including projections extending from said rotor means for propelling the substance introduced into said housing against said impact wall means for separating the substance into parts of different specific weights and for producing a stream of air directed against said impact wall means for entraining the parts of lower specific weight and carrying same along said impact wall means; first outlet means located in said circulation chamber adjacent to said impact wall means for the discharge of the parts having a lower specific weight, said impact wall means including a lower wall portion extending parallel to the axis of rotation of said rotor means and an upper wall portion extending towards said first outlet means; an alongated deflector element adjacent to said first outlet means having an upper edge hingedly connected to said housing and a lower edge extending into said circulation chamber towards said rotor means and substantially parallel to the axis of rotation of said rotor means and including an inner wall part hingedly connected to said lower edge and an outer wall part having one end hingedly connected to said inner wall part and another end hingedly connected to said housing, said elongated deflector element deflecting an outer layer of said stream of air moving towards said first outlet means; and second outlet means located in said housing below said impact means for the discharge of the parts having a higher specific weight whereby some of the parts of the substance entrained in the stream of air and moving along said impact wall means will be retained by said deflector element in said stream of air.

10. In a mill for the separation of a substance into parts of different specific weights, comprising, a housing; inlet means for introducing the substance into said housing and including a wall portion; impact wall means stationarily mounted in said housing spaced from said wall portion to form a circulation chamber with the same; rotor means mounted in said housing and including projections extending from said rotor means for propelling the substance introduced into said housing against said impact wall means for separating the substance into parts of different specific weights and for producing a stream of air directed against said impact wall means for entraining the parts of lower specific weight and carrying same along said impact wall means; supply means for increasing said stream of air for assisting the entrainment therein of the parts of lower specific weight and for carrying same along said impact wall means; first outlet means located in said circulation chamber adjacent to said impact wall means for the discharge of the parts having a lower specific weight; a deflector element adjacent said first outlet means and extending into said circulation chamber substantially parallel to the axis of rotation of said rotor means and spaced from said impact means for deflecting an outer layer of the stream of air moving towards said first outlet means; and second outlet means located in said housing below said impact means for the discharge of the parts having a higher specific weight whereby some of the parts of the substance entrained in the stream of air and moving along said impact wall means will be retained by said deflector element in said stream of air.

11. In a mill for the separation of a substance into parts of different specific weights, comprising, a housing; inlet means for introducing the substance into said housing and including a wall portion; impact wall means stationarily mounted in said housing spaced from said wall portion to form a circulation chamber with the same; rotor means mounted in said housing and including projections extending from said rotor means for propelling the substance introduced into said housing against said impact wall means for separating the substance into parts of different specific weights and for producing a stream of air directed against said impact wall means for entraining the parts of lower specific weight and carrying same along said impact wall means; adjustable supply means for increasing said stream of air for assisting the entrainment therein of the parts of lower specific weight and for carrying same along said impact wall means; first outlet means located in said circulation chamber adjacent to said impact wall means for the discharge of the parts having a lower specific weight; a deflector element adjacent said first outlet means and extending into said circulation chamber substantially parallel to the axis of rotation of said rotor means and spaced from said impact means for deflecting an outer layer of the stream of air moving towards said first outlet means; and second outlet means located in said housing below said impact means for the discharge of the parts having a higher specific weight whereby some of the parts of the substance entrained in the stream of air and moving along said impact wall means will be retained by said deflector element in said stream of air.

12. In a mill for the separation of a substance into parts of different specific weights, comprising, a housing; inlet means for introducing the substance into said housing and including a wall portion; impact wall means stationarily mounted in said housing spaced from said wall portion to form a circulation chamber with the same;

rotor means mounted in said housing and including projections extending from said rotor means for propelling the substance introduced into said housing against said impact wall means for separating the substance into parts of different specific weights and for producing a stream of air directed against said impact wall means for entraining the parts of lower specific weight and carrying same along said impact wall means; adjustable supply means for increasing said stream of air for assisting the entrainment therein of the parts of lower specific weight and for carrying same along said impact wall means; first outlet means located in said circulation chamber adjacent to said impact wall means for the discharge of the parts having a lower specific weight; an elongated deflector element adjacent to said first outlet means having an upper edge connected to said housing and a lower edge extending into said circulation chamber towards said rotor means and substantially parallel to the axis of rotation of said rotor means and including an inner wall part extending from said lower edge transverse to said impact wall means and an outer wall part extending from said inner wall part towards said housing, said elongated deflector element deflecting an outer layer of said stream of air moving towards said first outlet means; and second outlet means located in said housing below said impact means for the discharge of the parts having a higher specific weight whereby some of the parts of the substance entrained in the stream of air and moving along said impact wall means will be retained by said deflector element in said stream of air.

13. In a mill for the separation of a substance into parts of different specific weights, comprising, a housing; inlet means for introducing the substance into said housing and including a wall portion; impact wall means stationarily mounted in said housing spaced from said wall portion to form a circulation chamber with the same; rotor means mounted in said housing and including projections extending from said rotor means for propelling the substance introduced into said housing against said impact wall means for separating the substance into parts of different specific weights and for producing a stream of air directed against said impact wall means for entraining the parts of lower specific weight and carrying same along said impact wall means; adjustable supply means for increasing said stream of air for assisting the entrainment therein of the parts of lower specific weight and for carrying same along said impact wall means; first outlet means located in said circulation chamber adjacent to said impact wall means for the discharge of the parts having a lower specific weight, said impact wall means including a lower wall portion extending parallel to the axis of rotation of said rotor means and an upper wall portion extending towards said first outlet means; an elongated deflector element adjacent to said first outlet means having an upper edge hingedly connected to said housing and a lower edge extending into said circulation chamber towards said rotor means and substantially parallel to the axis of rotation of said rotor means and including an inner wall part hingedly connected to said lower edge and an outer wall part having one end hingedly connected to said inner wall part and another end hingedly connected to said housing, said elongated deflector element deflecting an outer layer of said stream of air moving towards said first outlet means; and second outlet means located in said housing below said impact means for the discharge of the parts having a higher specific weight whereby some of the parts of the substance entrained in the stream of air and moving along said impact wall means will be retained by said deflector element in said stream of air.

14. In a mill for the separation of substances into parts of different specific weights, comprising, a housing; inlet means for introducing the substance into said housing; impact wall means stationarily mounted in said housing spaced from said inlet means; rotor means mounted in said housing and including projections extending from said rotor means for propelling the substance introduced into said housing against said impact wall means for separating the substance into parts of different specific weights and for producing a stream of air in which parts of the lower specific weight are to be entrained and carried along said impact wall means; first outlet means located in said housing adjacent to said impact wall means for the discharge of the parts having a lower specific weight entrained and carried by said stream of air, said impact wall means including a lower wall portion extending parallel to the axis of rotation of said rotor means and an upper wall portion extending towards said first outlet means; a deflector element adjacent said first outlet means and extending towards said rotor means substantially parallel to the axis of said rotor means and spaced from said impact wall means for deflecting an outer layer of the stream of air moving towards said first outlet means; and second outlet means located in said housing below said impact wall means for the discharge of the parts having a higher specific weight.

15. In a mill for the separation of a substance into parts of different specific weight, comprising, a housing, inlet means for introducing the substance into said housing; impact wall means stationarily mounted in said housing spaced from said inlet means; rotor means mounted in said housing and including projections extending from said rotor means for propelling the substance introduced into said housing against said impact wall means for separating the substance into parts of different specific weights and for producing a stream of air in which parts of the lower specific weight are to be entrained and carried along said impact wall means; first outlet means for the discharge of the parts having a lower specific weight entrained and carried by said stream of air, said impact wall means including a lower wall portion extending parallel to the axis of rotation of said rotor means and an upper wall portion extending towards said first outlet means; an elongated deflector element adjacent said first outlet means having an upper edge hingedly connected to said housing and a lower edge extending towards said rotor means and substantially parallel to the axis of rotation thereof, and including an inner wall part hingedly connected to said lower edge and an outer wall part having one end hingedly connected to said inner wall part and another end hingedly connected to said housing, said elongated deflector element deflecting an outer layer of said stream of air moving towards said first outlet means; and second outlet means located in said housing below said impact wall means for the discharge of the parts having a higher specific weight.

16. In a mill for the separation of a substance into parts of different specific weights, comprising, a housing; inlet means for introducing the substance into said housing and including a wall portion; impact wall means stationarily mounted in said housing and spaced from said wall portion to form a circulation chamber with the same; rotor means mounted in said housing and including projections extending from said rotor means for propelling the substance introduced into said housing against said impact wall means and for separating the substance into parts of different specific weights and for producing a stream of air in said circulation chamber directed against said impact wall means for entraining the parts of lower specific weight and carrying same along said impact wall means; adjusting means for selectively adjusting the spacing of said impact wall means from said wall portion and said rotor means; supply means for increasing said stream of air for assisting the entrainment therein of the parts of lower specific weight and for carrying the same along said impact wall means; first outlet means located in said circulation chamber adjacent to said impact wall means for the discharge of the parts having a lower specific weight, said impact wall means including a lower wall portion extending parallel to the axis of rotation of said rotor means and upper wall portion extending towards said first outlet means; an elongated deflector element adjacent to said first outlet means and having an upper edge hingedly connected to said housing and a lower edge extending towards said rotor means and substantially parallel to the axis of rotation thereof and including an inner wall part hingedly connected to said lower edge and an outer wall part having one end hingedly connected to said inner wall part and another end hingedly connected to said housing, said elongated deflector element deflecting an outer layer of said air stream moving towards said first outlet means; and second outlet means located in said housing below said impact wall means for the discharge of parts having a higher specific weight, whereby some of the parts of the substance of lower specific weight entrained in the stream of air and moving along said impact wall means will be retained by said deflector element in said stream of air.

17. In a mill for the separation of a substance into parts of different specific weights, comprising, a housing; inlet means for introducing the substance into said housing and including a wall portion; impact wall means stationarily mounted in said housing and spaced from said wall portion to form a circulation chamber with the same, apertures formed in said impact wall means; rotor means mounted in said housing and including projections extending from said rotor means for propelling the substance introduced into said housing against said impact wall means for separating the substance into parts of different specific weights and for producing a stream of air in said circulation chamber directed against said impact wall means for entraining the parts of lower specific weight and carrying same along said impact wall means; adjusting means for selectively adjusting the spacing of said impact wall means from said wall portion and said rotor means; supply means connected to said impact wall means for increasing through said apertures said stream of air for assisting the entrainment therein of the parts of lower specific weight and for carrying same along said impact wall means; first outlet means located in said circulation chamber adjacent to said impact wall means for the discharge of the parts having a lower specific weight, said impact wall means including a lower wall portion extending parallel to the axis of rotation of said rotor means and upper wall portion extending towards said first outlet means; an elongated deflector element adjacent to said first outlet means and having an upper edge hingedly connected to said housing and a lower edge extending towards said rotor means and substantially parallel to the axis of rotation thereof and including an inner wall part hingedly connected to said lower edge and an outer wall part having one end hingedly connected to said inner wall part and another end hingedly connected to said housing, said elongated deflector element deflecting an outer layer of said air stream moving towards said first outlet means; and second outlet means located in said housing below said impact wall means for the discharge of parts having a higher specific weight, whereby some of the parts of the substance of lower specific weight entrained in the stream of air and moving along said impact wall means will be retained by said deflector element in said stream of air.

References Cited in the file of this patent

UNITED STATES PATENTS

| | | |
|---|---|---|
| 1,200,104 | Haskell | Oct. 3, 1916 |
| 1,624,435 | Redus | Apr. 12, 1927 |
| 1,751,009 | Liggett | Mar. 18, 1930 |
| 1,975,406 | Reschke | Oct. 2, 1934 |
| 2,488,799 | Bonnafoux | Nov. 22, 1949 |
| 2,919,863 | Lejeune | Jan. 5, 1960 |